United States Patent
Wigren

(10) Patent No.: US 12,015,461 B2
(45) Date of Patent: Jun. 18, 2024

(54) METHODS, APPARATUS AND MACHINE-READABLE MEDIUMS RELATING TO ADJUSTING BEAM GAIN IN WIRELESS COMMUNICATION NETWORKS

(71) Applicant: Telefonaktiebolaget LM Ericsson (publ), Stockholm (SE)

(72) Inventor: Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 17/424,495

(22) PCT Filed: Jan. 9, 2020

(86) PCT No.: PCT/SE2020/050008
§ 371 (c)(1),
(2) Date: Jul. 21, 2021

(87) PCT Pub. No.: WO2020/153887
PCT Pub. Date: Jul. 30, 2020

(65) Prior Publication Data
US 2022/0014245 A1 Jan. 13, 2022

Related U.S. Application Data

(60) Provisional application No. 62/794,835, filed on Jan. 21, 2019.

(51) Int. Cl.
*H04B 7/06* (2006.01)
*H04B 7/08* (2006.01)

(52) U.S. Cl.
CPC ........ *H04B 7/0617* (2013.01); *H04B 7/0695* (2013.01); *H04B 7/086* (2013.01); *H04B 7/0862* (2013.01)

(58) Field of Classification Search
CPC .... H04B 7/0617; H04B 7/0695; H04B 7/086; H04B 7/0862; H04B 7/0465
See application file for complete search history.

(56) References Cited

U.S. PATENT DOCUMENTS

| | | | |
|---|---|---|---|
| 2010/0254325 A1* | 10/2010 | Narasimhan | H04B 7/0417 370/329 |
| 2012/0051287 A1* | 3/2012 | Merlin | H04L 25/03343 370/328 |
| 2014/0307704 A1 | 10/2014 | Arogyaswami | |

FOREIGN PATENT DOCUMENTS

| | | | | |
|---|---|---|---|---|
| EP | 1671431 B1 | 9/2010 | | |
| WO | WO-2005025117 A2 * | 3/2005 | | H03M 13/33 |

OTHER PUBLICATIONS

International Search Report and Written Opinion for Application No. PCT/SE2020/050008, dated Mar. 2, 2020, 12 pages.

(Continued)

*Primary Examiner* — Nishant Divecha
(74) *Attorney, Agent, or Firm* — Nicholson De Vos Webster & Elliott LLP

(57) ABSTRACT

A method for adjusting beam gain in a radio network node. The method comprises: obtaining a channel estimate based on a reference signal transmitted by a target wireless device; applying a set of weights to the channel estimate to obtain a weighted channel estimate; and outputting the weighted channel estimate for use in determining beamforming weights to be applied to signals output to a plurality of antenna elements for transmission to the target wireless device, wherein the beamforming weights are determined as a function of the weighted channel estimate.

17 Claims, 13 Drawing Sheets

(56) References Cited

OTHER PUBLICATIONS

Communication pursuant to Article 94(3) EPC for EP App. No. 20700632.1, Jun. 1, 2023, 5 pages.
International Preliminary Report on Patentability for Application No. PCT/SE2020/050008, Jul. 29, 2021, 9 pages.

* cited by examiner

METHODS, APPARATUS AND MACHINE-READABLE MEDIUMS RELATING TO ADJUSTING BEAM GAIN IN WIRELESS COMMUNICATION NETWORKS

CROSS-REFERENCE TO RELATED APPLICATIONS

This application is a National stage of International Application No. PCT/SE2020/050008, filed Jan. 9, 2020, which claims priority to U.S. Application No. 62/794,835, filed Jan. 21, 2019, which are hereby incorporated by reference.

TECHNICAL FIELD

Embodiments of the disclosure relate to wireless communication networks, and particularly to methods, apparatus and machine-readable mediums for adjusting beam gain in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some countries, among these Japan, operators may require that the gain of an antenna system is kept below a pre-specified threshold. There may be many reasons for this, e.g. requirements to avoid interference on other technical systems sensitive to radio frequency (RF) emissions, or to facilitate deployment of cellular systems in the same geographical area. The requirement in Japan is due to inter-operator agreements to allow deployment with a uniform limit on the interference level.

Radio network nodes such as base stations increasingly utilize advanced antenna systems (AASs) to increase capacity and coverage. AASs comprise a plurality of antenna elements, sometimes arranged in an antenna array. Signals output to the plurality of antenna elements are adapted by the application of one or more of an amplitude change and a phase shift, so as to generate transmit beams having higher beam or antenna gain in a particular direction through constructive interference at the receiving device (e.g., a user equipment or UE). AASs may additionally use MIMO techniques to transmit multiple data streams over the transmit beam.

Beamforming Basics

FIG. 1 shows an antenna array used for beamforming, and particularly an idealized one-dimensional beamforming case, in which a user equipment (UE) is located far from an antenna array in a base station. The difference in travel distance from the base station to the UE between adjacent antenna elements, l, of a plurality of beam elements, may be given by $l = k\lambda \sin(\theta),$ where $k\lambda$ is the antenna element separation. Here $\lambda$ is a wavelength and k is the separation factor which may typically be 0.5-0.7 in a correlated antenna element arrangement. A reference signal $s_i e^{j\omega t}$ that is transmitted from the i:th antenna element at the base station arrives at an antenna at the UE as a weighted sum $S_{UE}$ $$S_{UE} = \sum_{i=0}^{N-1} s_i h_i e^{j\omega\left(t - \frac{il}{c}\right)} = e^{j\omega t} \sum_{i=0}^{N-1} s_i h_i e^{-2\pi jk i \sin(\theta)},$$

where $\omega$ is an angular carrier frequency, $h_i$ is a complex channel from the ith antenna element, t is a time, and $f_c$ is a carrier frequency. The angle $\theta$ and the complex channel $h_i$ may be determined by the UE. In case of a feedback solution, the UE may thus search for all complex channel coefficients $h_i$ and the unknown angle $\theta$.

To understand the beam gain of an antenna array, consider the one-dimensional array of FIG. 1. For an antenna array supplied with power P that is equally divided between the antennas in the antenna array, the power applied to each antenna element is P/n. In the far field of the beam, the fields generated by the antenna elements when transmitting the same signal s add constructively, resulting in the combined signal ns. The power of the transmitted signal in the far field may thus be given by $n^2|s|^2 = n^2 P/n = nP$. Hence the beam forming gain may be equal to n, or, in the common logarithmic domain, the beam forming gain may be given by $G = 10 \log_{10} n = 10 \log_2 n \log_{10} 2 \approx 3 \log_2 n.$ For an antenna array with $n = 2^k$ elements, the gain may thus be expressed as $G \approx 3.0 \log_2 2^k = 3.0 \, k$ dBi, provided that the number of antenna elements is a power of two. An antenna array with 512 array elements each with a beam gain of 1 or 0 dBi may thus have a beam gain of 27 dBi, where dBi represents the gain relative to an isotropic radiator (decibels relative to isotropic).

Reciprocity Assisted Transmission (RAT)

Given two nodes equipped with antenna arrays that communicate in a single frequency band, channel reciprocity means that at any given point in time, the complex channel coefficient between any transmitting antenna element in one node and any receiving antenna element in the other node, is the same (to within a transpose) in the uplink and the downlink. The channel matrix hence essentially remains the same between the antenna arrays of the two nodes when the direction of the transmission is reversed. The two nodes may, for example, be a wireless device (e.g. a UE) and a base station. The base station may be, for example, an evolved Node B (eNB) or a next generation Node B (gNB). The time may be assumed to be the same for the two directions of transmission. For example, the downlink transmission may take place sufficiently close in time to the uplink transmission that the channel matrix can be considered invariant for both transmissions.

To exploit reciprocity, channel coefficients can be directly estimated by a base station from a transmission of known pilot signals from the UE on the uplink. The pilot symbols may be, for example, sounding reference signals (SRSs). As the uplink and downlink channels are the same (to within a transpose) when reciprocity is valid, the estimated channel can be used to compute the combining weight matrix using a selected principle, and then used for downlink transmission. Those skilled in the art will be aware of multiple methods for estimating the channel based on reception of a known reference signal. The present disclosure is not limited in that respect.

The beamforming weights for a RAT scheme may be obtained using a minimum mean square error (MMSE) estimator. The beamforming weights W may satisfy $$I = \hat{H}W + \tilde{H}W,$$

for any number of users and antenna elements. In this equation, $\hat{H}$ is an estimated channel with dimension (Nrx, Ntx), in which Nrx is the total number of receive antennas for all UEs which are to receive the transmission, and Ntx is the number of base station antennas. $\tilde{H}$ is the channel estimation error, which may be assumed to have a covariance matrix $\Gamma$. The beam weights may be determined by applying an MMSE criterion such that $E\{WW^H\} = I$. An MSSE estimate of the beam weights may thus be given by $$\hat{W} = \hat{H}^H (\hat{H}\hat{H}^H + \Gamma)^{-1}.$$

There currently exist certain challenge(s). With the introduction of large antenna arrays in Active Antenna Systems (AASs) in 4G and 5G cellular systems, the typical beam gains of cellular antenna systems have increased, creating a need to restrict the beam gain of cellular antenna systems. There are methods for reducing the power in order to limit the power density or the equivalent isotropic radiated power (EIRP). For example, for an Orthogonal Frequency-Division Multiple Access (OFDMA) transmission using digital radio, the number of tones used for a transmission is directly proportional to the transmit power. Therefore, the EIRP may be reduced by scheduling a fraction of the tones. However, no such mechanism exists for the beam gain, where power limitations such as tone restriction cannot be used.

Further problems can arise when using RAT. It can be computationally expensive to compute the maximum beam gain from the beam forming equation above that gives W. Once a beam gain has been computed, methods are still needed for adjusting the beam gain.

Further problems may arise when Multiple-Input Multiple-Output (MIMO) transmission is applied over AASs. The gain of an MS may be significantly higher than the operator requirements, meaning that the gain may need to be reduced. However, MIMO transmissions use a beam pattern, rather than a simple beam. Methods are then needed to reduce the beam gain of the beam pattern in order to comply with operator requirements.

Certain aspects of the present disclosure and their embodiments may provide solutions to these or other challenges.

SUMMARY

Aspects of the disclosure solve the problem of beam gain adjustment in Reciprocity Assisted Transmission (RAT) by disclosing a mechanism for constructively adjusting the beam gain for any channel matrix estimate $\hat{H}$. In detail, the disclosure provides i) The use of a single beam widening parameter in a new RAT-algorithm for reducing the beam gain.
ii) The use of a beam gain adjustment mechanism in a new iterative procedure, to fine tune beam gain adjustment to a pre-determined beam gain requirement.
iii) The use of tabulation of a beam gain reduction as a function of the beam widening parameter. The tabulation may then be used to initialize the iterative procedure.
iv) The application of said mechanism and procedure in a radio network node with an AAS, thereby limiting the momentary beam gain when applying RAT to be below a pre-determined limit.

Aspects of the disclosure thus provide methods for consistently and predictably reducing beam gain when using RAT. There are, proposed herein, various embodiments which address one or more of the issues disclosed herein. In one aspect, there is provided a method for adjusting beam gain in a radio network node (such as a base station). The method comprises obtaining a channel estimate based on a reference signal transmitted by a target wireless device, applying a set of weights to the channel estimate to obtain a weighted channel estimate, and outputting the weighted channel estimate for use in determining beamforming weights to be applied to signals output to a plurality of antenna elements for transmission to the target wireless device, wherein the beamforming weights are determined as a function of the weighted channel estimate.

Certain embodiments may provide one or more technical advantage(s), such as providing a mechanism for adjusting beam gain in RAT communications.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Beam Gain Reduction by Null Widening Transformation

Figure 1:
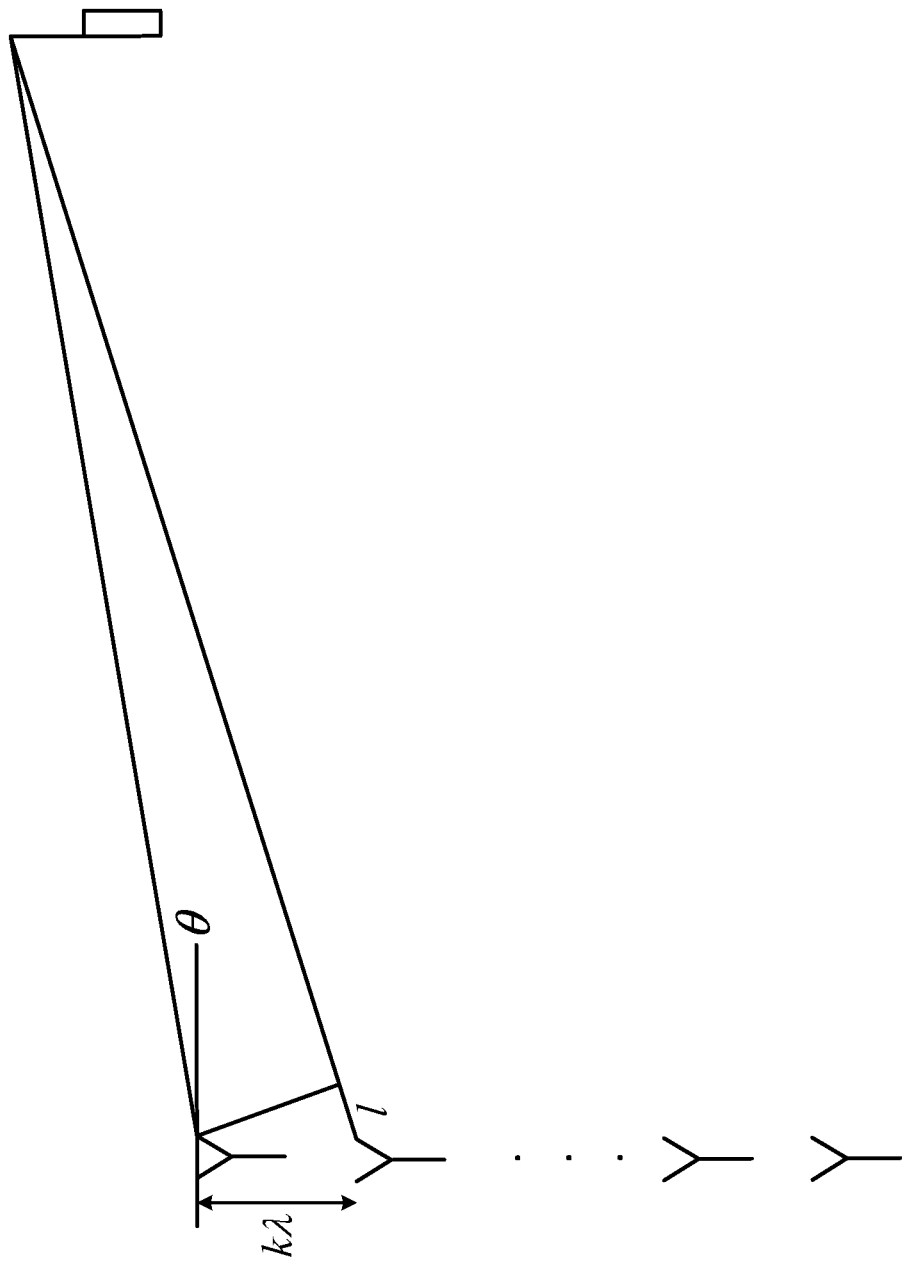
FIG. 1 shows an antenna array used for beamforming.
Figure 2:
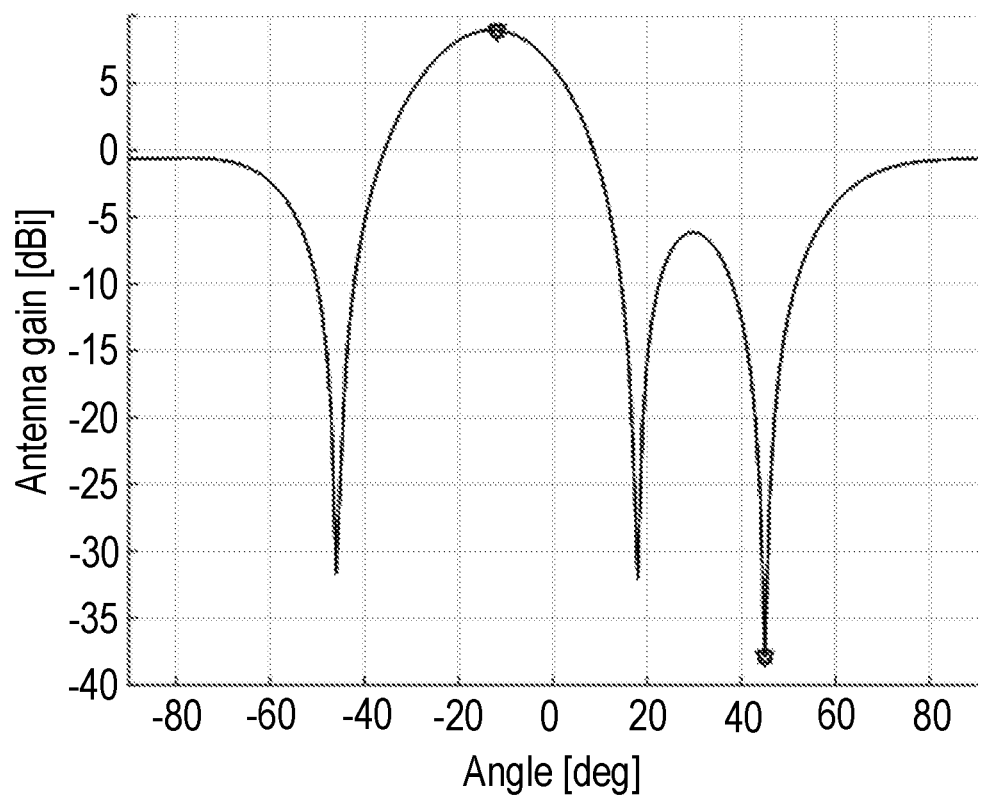
FIG. 2 shows the RAT antenna gain according to one example.

A RAT algorithm may use a gain that is close to zero in a direction of one or more interfered wireless devices. In the spatial antenna frequency domain, zeros are placed on or close to the unit circle, from which the antenna diagram is produced. The presence of zeros on the unit circle means that the precoder matrix coefficients, when viewed as a spatial polynomial, also have zeros on the unit circle, as the channel matrix coefficients have zeros on or close to the unit circle when the channel is flat. This is apparent from the RAT beamforming equation given above which is proportional to $\hat{H}$. FIG. 2 shows the RAT antenna gain for a radio network node with a flat channel with a target wireless device at −12 degrees and a neighbouring wireless device at 43 degrees, their respective locations indicated by the triangles in the graph. The neighbouring wireless device may experience interference due to communications between the radio network node and the target wireless device. RAT produces a beam with 9 dBi gain at the target wireless device to which signals are being transmitted and a very narrow null with a gain of almost −40 dBi at the interfered wireless device.

Embodiments of the disclosure use a modified channel matrix to move the zeros of the channel model inside the unit circle so that they are inside another circle with a radius that is less than one. This ensures that there is a non-zero distance in the complex plane from the unit circle to a zero, thereby preventing the antenna gain for the zero from being equal to zero.

Figure 3:
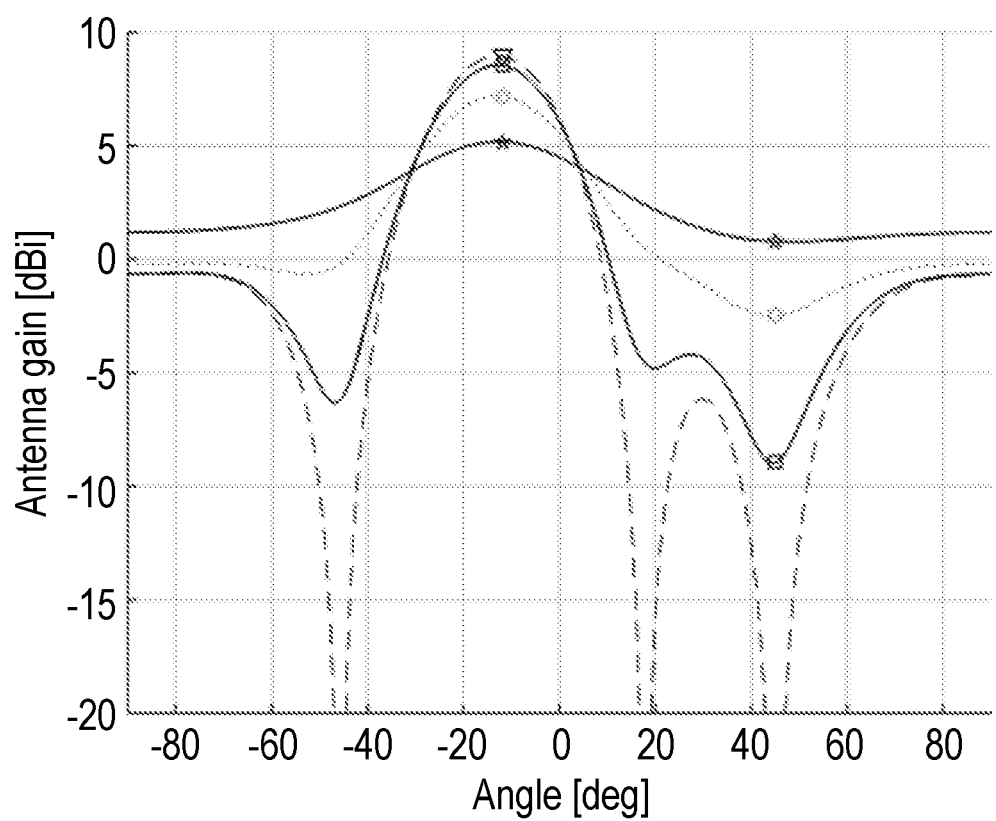
FIG. 3 shows the variation of beam gain for different null widening parameter values.

Embodiments of the disclosure utilize the property that a widening of a null in the beam gain is accompanied by a reduction of a beam gain in a transmission direction. The reduction may be non-linear. This effect is demonstrated in FIG. 3, which shows the variation of the beam gain as a null widening parameter $\rho$ is varied. In particular, FIG. 3 shows the variation of the beam gain (maximum→minimum) for $\rho=0.99$ (dashed line, triangular data points), $\rho=0.75$ (solid line, square data points), $\rho=0.50$ (dotted line, hexagonal data points) and $\rho=0.25$ (solid line, star data points). The reduction in the beam gain is not linear. The beam gain in the direction of the target UE is reduced by 4 dBi in this example. As in FIG. 2, a target wireless device is at −12 degrees and a neighbouring (interfered) wireless device is at 43 degrees. Decreasing the null widening parameter $\rho$ widens the nulls in the antenna gain such as the null at the interfered wireless device at 43 degrees, and also reduces the beam gain towards the target wireless device.

The widening of nulls in the beam gain thus provides an adjustment mechanism that can be used to modify the beam gain of a network node. In particular embodiments, this adjustment mechanism may be used for an MS used for RAT transmission.

Embodiments of the disclosure implement the beam gain adjustment mechanism by weighting the channel matrix $\hat{H}$ with a set of weights to obtain a weighted channel matrix. In one embodiment, the set of weights is dependent on a single configured parameter, referred to herein as a null widening parameter $\rho$. The set of weights may comprise values selected from $\rho^x$, where x is an integer. In one particular embodiment, the set of weights, or weighting factor $\rho$, is given by $$\rho = \begin{pmatrix} \rho^0 & \cdots & \rho^{Ntx-1} \\ \vdots & \ddots & \vdots \\ \rho^0 & \cdots & \rho^{Ntx-1} \end{pmatrix}.$$

for an antenna system with Ntx antennas. This matrix has dimension Nrx by Ntx, where Nrx is the number of antenna elements in the recipient antenna system.

The weighting factor $\rho$ may satisfy $|\rho|<1$. Alternatively, the weighting factor may satisfy $|\rho|>1$.

The weighted channel matrix $\check{H}$ may then be given by $$\check{H} = \rho \cdot \hat{H},$$

where · denotes the Hadamard matrix product, expressing elementwise matrix multiplication. A matrix element expressed in polar form may then be given by $$\check{H}_{r,t} = \rho^{tx} \gamma \exp(2\pi i k \sin(\theta_{rx})t),$$

in which $\rho^{tx}$ is an element of the weighting factor matrix $\rho$ and $\gamma$ is the complex channel gain (e.g., as estimated in the uplink). The weighted channel matrix, $\check{H}$ may then be used instead of the channel matrix $\hat{H}$ in the computation of the beam forming matrix W in the beam weight calculation described above.

Therefore, a mechanism for adjusting the beam gain is provided, in which a weighting factor $\rho$ is applied to the channel matrix $\hat{H}$ in order to determine the weighted channel matrix $\check{H}$. The weighting factor $\rho$ may be dependent on the null widening parameter $\rho$.

Iterative Determination of $\rho$

The value of the null widening parameter $\rho$ may be determined by solving the equation $$G(1) - \Delta G - G(\rho) = 0$$

for $\rho$. $G(\rho)$ denotes a maximum RAT beam gain as a function of the parameter null widening parameter $\rho$. $G(1)$ therefore denotes the maximum beam gain of RAT without any null widening, and $\Delta G$ denotes the desired beam gain reduction.

As noted above, the reduction in the gain with $\rho$ may be non-linear. In addition, the gain variation may vary with the channel matrix, such that the variation in gain differs if, for example, the channel is not flat. Therefore, the value of the null widening parameter $\rho$ needed to achieve a desired beam gain reduction $\Delta G$ may be iteratively computed based on the equation above and starting with an initial value $\rho_0$. Those skilled in the art will appreciate that there are any number of approaches for iteratively solving the above equation. In an embodiment, a root finding or minimization method is used to obtain a solution for $$f(\rho) = 0$$

where $$f(\rho) = G(1) - \Delta G - G(\rho).$$

One example root finding method that may be used is the quasi gradient method, which evaluates the function, $f(\rho)$ at $\rho_i$ and $\rho_i + \Delta\rho$ and uses a Taylor series approximation to get the iteration $$\rho_{i+1} = \rho_i - \Delta\rho \frac{f(\rho_i)}{f(\rho_i + \Delta\rho) - f(\rho_i)},$$

which may be iterated to determine a value of $\rho$.

Tabulated Beam Gain Reduction with Beam Widening Parameters

An initial value, $\rho_0$, may be used to determine p using an iterative approach. In some embodiments, values of $\rho$ may be calculated for particular values of the beam gain reduction, assuming a particular channel condition, and subsequently used as initial values for the iterative algorithm. For example, the calculation of $\rho$ for a particular value of the beam gain reduction may assume that the channel is flat. The values of the beam gain reduction may be calculated for a particular antenna array or group of antenna arrays.

The beam gain reduction for a particular antenna array or group of antenna arrays as a function of ρ may thus be calculated for a nominal case, e.g. for a flat channel. Given the desired beam gain adjustment a tabulated value of ρ is then selected to initialize the iterative algorithm. Linear interpolation between adjacent table entries may also be used, for example if the required beam gain adjustment does not correspond to one of the table entries.

For example, the following table shows the variation in the gain reduction factor for varying values ρ and gain for the antenna array used to generate FIGS. 2 and 3.

| ρ | Gain [dbi] | Gain reduction factor |
|---|---|---|
| 1.00 | 9.0 | 1.0 |
| 0.90 | 8.9 | 0.98 |
| 0.80 | 8.7 | 0.93 |
| 0.70 | 8.3 | 0.85 |
| 0.60 | 7.8 | 0.76 |
| 0.50 | 7.2 | 0.66 |
| 0.40 | 6.4 | 0.55 |
| 0.30 | 5.6 | 0.46 |
| 0.20 | 4.8 | 0.38 |
| 0.10 | 3.9 | 0.31 |

Figure 4:
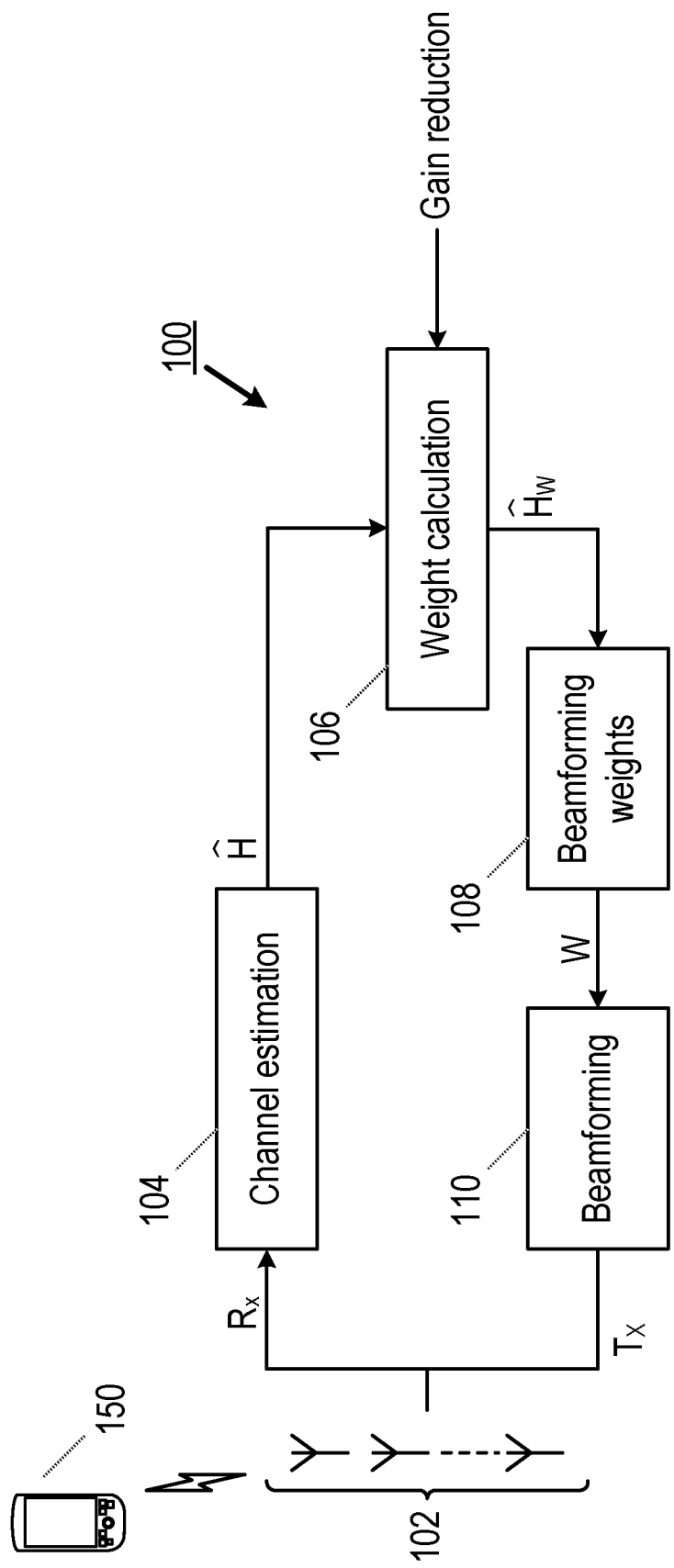
FIG. 4 shows a system according to embodiments of the disclosure.

FIG. 4 shows a system according to embodiments of the disclosure. The system comprises a radio network node 100 and a target wireless device 150 (e.g., a UE). The radio network node 100 may be, for example, a base station. The radio network node 100 comprises a plurality of antenna elements 102 (which may be arranged in an array), a channel estimation unit 104, a weight calculation unit 106, a beamforming weight determination unit 108, and a beamforming unit 110.

As illustrated, the plurality of antenna elements 102 comprises three or more antenna elements 102, although those skilled in the art will appreciate that any number of antenna elements more than one may be provided. In one embodiment, the plurality of antenna elements 102 form part of an MS.

The plurality of antenna elements 102 are configured to transmit signals to and receive signals from the target wireless device 150. According to embodiments of the disclosure, the channel estimation unit 104 obtains a reference signal transmitted by the target wireless device 150 and received at the plurality of antenna elements 102. The reference signal may be a Sounding Reference Signal (SRS) or any other suitable reference signal.

The channel estimation unit 104 calculates a channel estimate Ĥ based on the received reference signal. Those skilled in the art will appreciate that there may be many suitable methods for estimating a channel based on a reference signal.

The channel estimate is output to the weight calculation unit 106, which applies a set of weights to the channel estimate and outputs a weighted channel estimate. The weight calculation unit 106 may additionally determine the set of weights which are applied to the channel estimate.

The set of weights may be determined based on a configured beam gain value (or reduction in gain value), so as to achieve a particular reduction in beam gain. The configured beam gain value may define an upper limit for the beam gain in a particular direction (i.e., a maximum threshold which the beam gain should not exceed). The upper limit may be defined as an absolute value, or an offset relative to a reference value for example. In the latter embodiment, the offset may define a reduction from the reference value (such as a reduction in gain from the maximum gain of the radio network node).

The beam gain value may be configured by the network, or the network operator. Alternatively, the beam gain value may be determined or calculated by the radio network node itself. In the latter embodiment, the configured beam gain value may be determined as a function of one or more radio network performance metrics. For example, the radio network node may determine the configured beam gain value based on one or more of: an amount of traffic in a cell defined by the radio network node; an amount of intercell interference experienced in the cell; and an amount of adjacent frequency interference experienced in the cell. Thus, when the traffic or interference is relatively high, the beam gain value may be determined to be relatively low (e.g., a greater reduction from the reference value), so as to reduce the interference caused to other nodes and devices.

The set of weights may be defined based on a parameter ρ, such as the null widening parameter described above. The parameter ρ may be determined by solving $$G(1) - \Delta G - G(\rho) = 0$$

where G(1) denotes a maximum beam gain without weighting of the channel estimate, G(ρ) denotes a maximum beam gain with weighting as a function of the parameter ρ, and ΔG is the given reduction in beam gain.

In an embodiment, determining the set of weights comprises iteratively adjusting the set of weights until the given reduction in beam gain is achieved. Thus, the set of weights may be determined by starting from a set of initial values and then iteratively re-determining the set of weights. In particular embodiments, a minimisation or root-finding algorithm may be used to determine the set of weights. For example, a root finding or minimization method is used to obtain a solution for $$f(\rho) = 0$$

where $$f(\rho) = G(1) - \Delta G - G(\rho).$$

One example root finding method that may be used is the quasi gradient method, which evaluates the function, $f(\rho)$ at $\rho_i$ and $\rho_i + \Delta\rho$ and uses a Taylor series approximation to get the iteration $$\rho_{i+1} = \rho_i - \Delta\rho \frac{f(\rho_i)}{f(\rho_i + \Delta\rho) - f(\rho_i)},$$

which may be iterated to determine a value of ρ. The iteration may be performed until, for example, a desired accuracy is achieved or the set of weights converges to some value, or after a certain number of iterations.

The set of initial values may be selected to achieve the given reduction in beam gain, and assuming a particular channel condition. For example, the initial values of ρ for a particular value of the beam gain reduction may assume that the channel is flat (e.g. frequency-independent). The set of initial values may be selected from a look-up table. Linear interpolation between adjacent table entries may also be used, for example if the required beam gain adjustment does not correspond to one of the table entries.

The beamforming weight calculation unit 108 receives the weighted channel matrix and calculates beamforming weights (e.g., using RAT techniques) for a transmission to the wireless device 150. The determined set of beamforming weights, W, is then output to the beamforming unit 110. For example, in one embodiment, the beamforming weight calculation unit 108 may use an MMSE algorithm to calculate the set of weights, e.g., according to the following equation:

$$W = \hat{H}_w (\hat{H}_w \hat{H}_w^H + \Gamma)^{-1}$$

where $\hat{H}_w$ is the weighted channel estimate, $\Gamma$ is the covariance matrix of a channel estimation error, and $\hat{H}_w^H$ is the complex transpose of $\hat{H}_w$.

The beamforming unit applies the beamforming weights W to a signal vector intended for transmission to the wireless device 150, and outputs weighted signals to the plurality of antenna elements 102 for transmission. The signals may comprise one or more of: user data; control data; and reference signals.

Those skilled in the art will appreciate that base stations are becoming increasingly fragmented, comprising multiple logical network nodes (e.g., centralized unit, distributed unit, radio unit, etc) and with functionality divided between those logical network nodes. The various units described in FIG. 4 as belonging to the radio network node (or base station) 100 may thus belong to different logical network nodes.

For example, in some embodiments, the channel estimation unit 104 and the weight calculation unit 106 may be in an uplink unit in the network node. The uplink unit may be, for example, an uplink baseband unit. The beamforming weight determination unit 108 and the beamforming unit 110 may be located in a downlink unit. Thus, the steps of obtaining the channel estimate and determining the channel weights may be performed in one part of the network node 100, whereas the steps of determining the beamforming weights and applying the beamforming weights to a beamforming algorithm may be performed in another part of the network node 100. In alternative embodiments, the weight calculation unit 106 may be located in the downlink unit (with the beamforming weight determination unit 108 and the beamforming unit 110). In yet further embodiments, of course, the channel estimation unit 104, the weight calculation unit 106, the beamforming weight determination unit 108 and the beamforming unit 110 may all be located in the network node 100. The nodes may be physical nodes or logical nodes.

Figure 5:
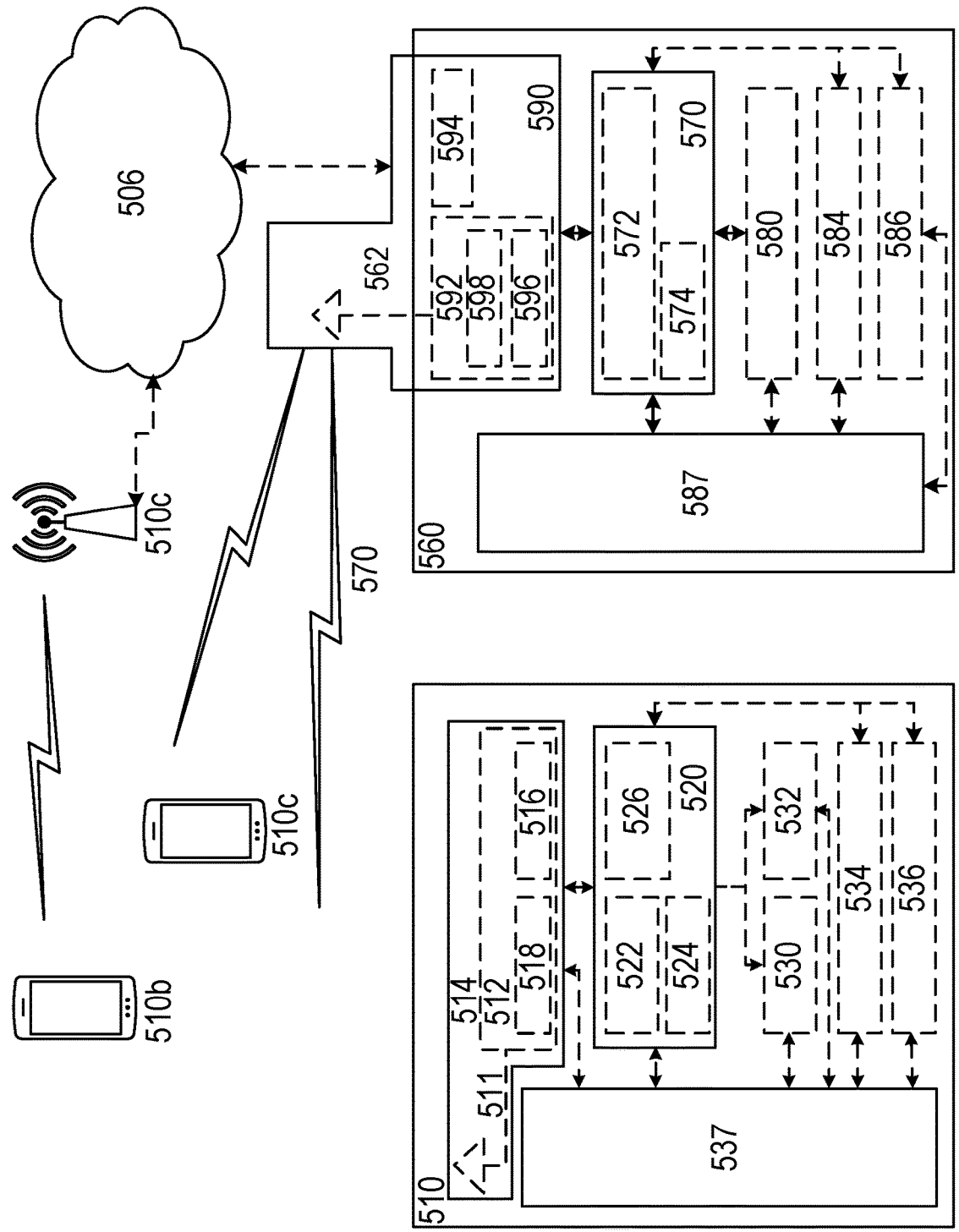
FIG. 5 shows a wireless network according to embodiments of the disclosure.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
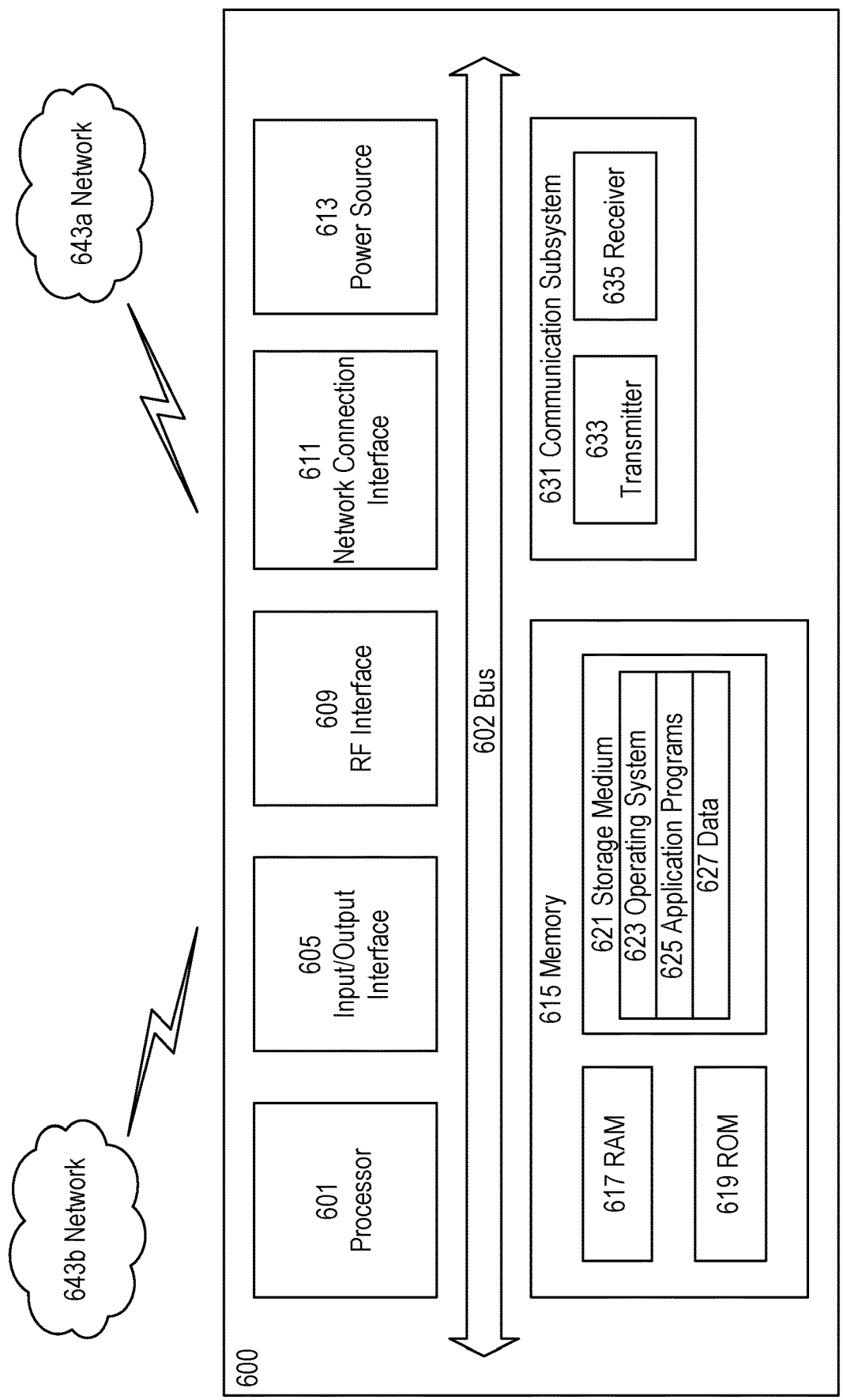
FIG. 6 shows a user equipment according to embodiments of the disclosure.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the $3^{rd}$ Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
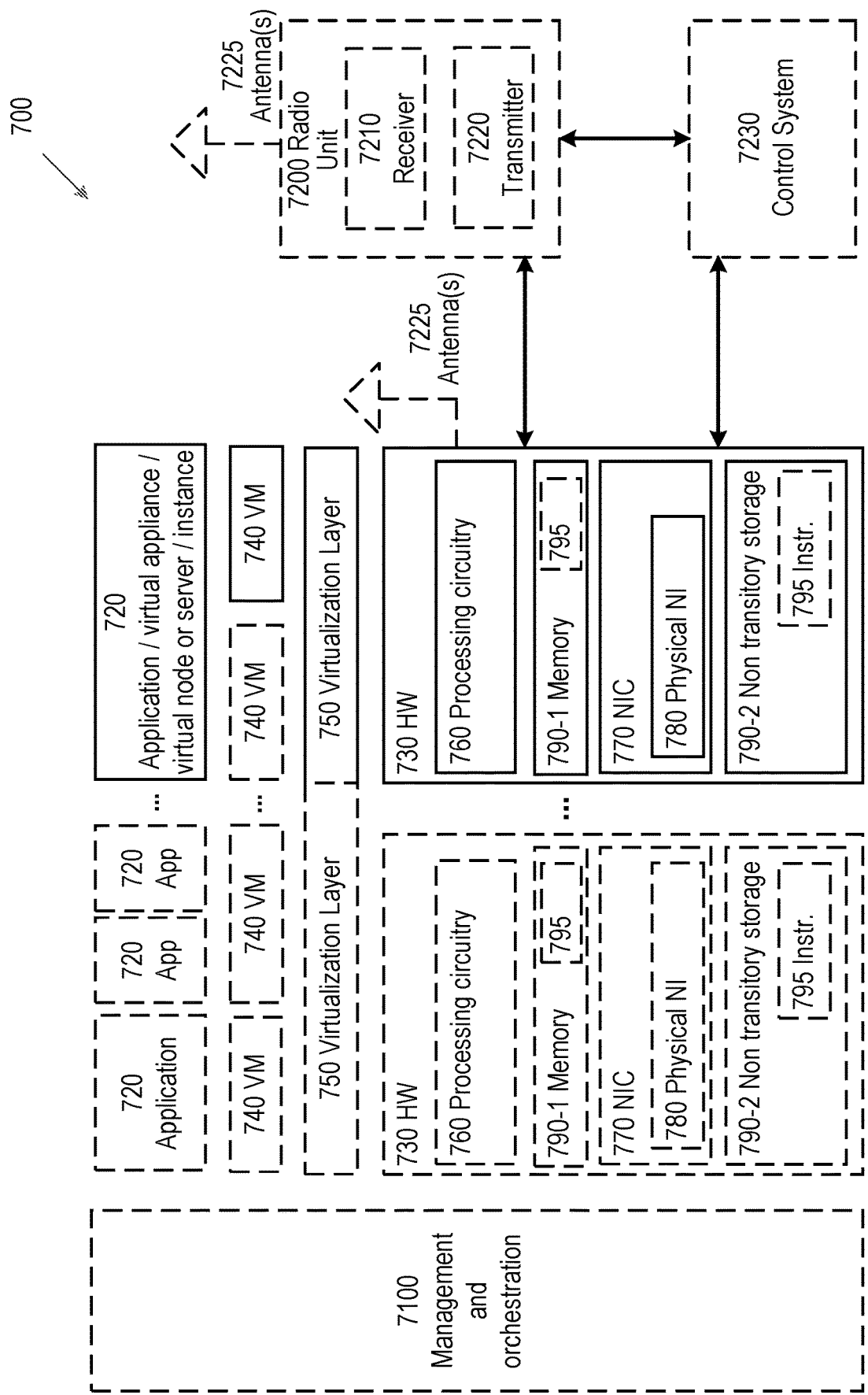
FIG. 7 shows a virtualization environment according to embodiments of the disclosure.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
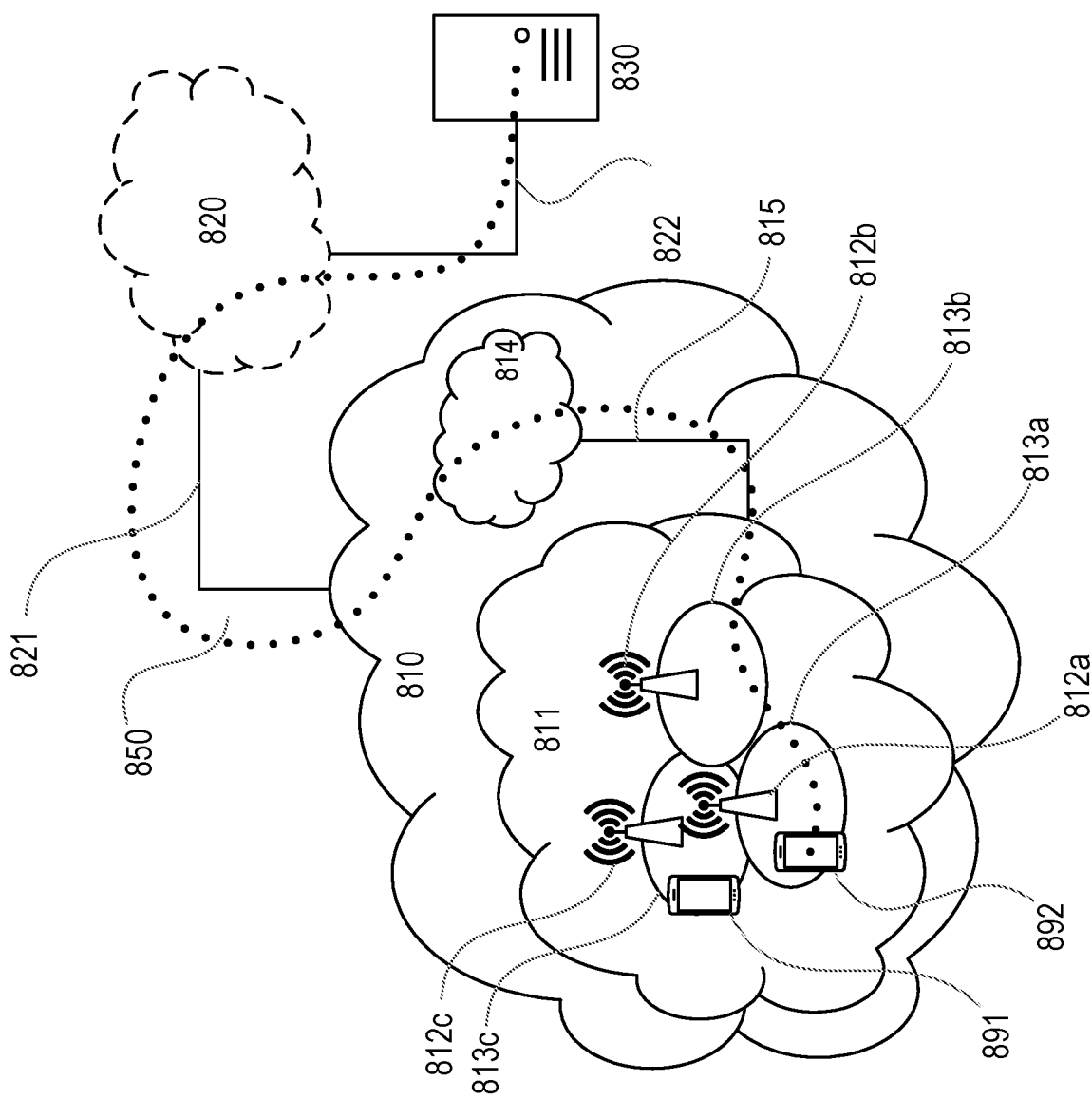
FIG. 8 shows a telecommunication network according to embodiments of the disclosure.

FIG. 8 shows a telecommunication network connected via an intermediate network to a host computer in accordance with some embodiments. With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 9:
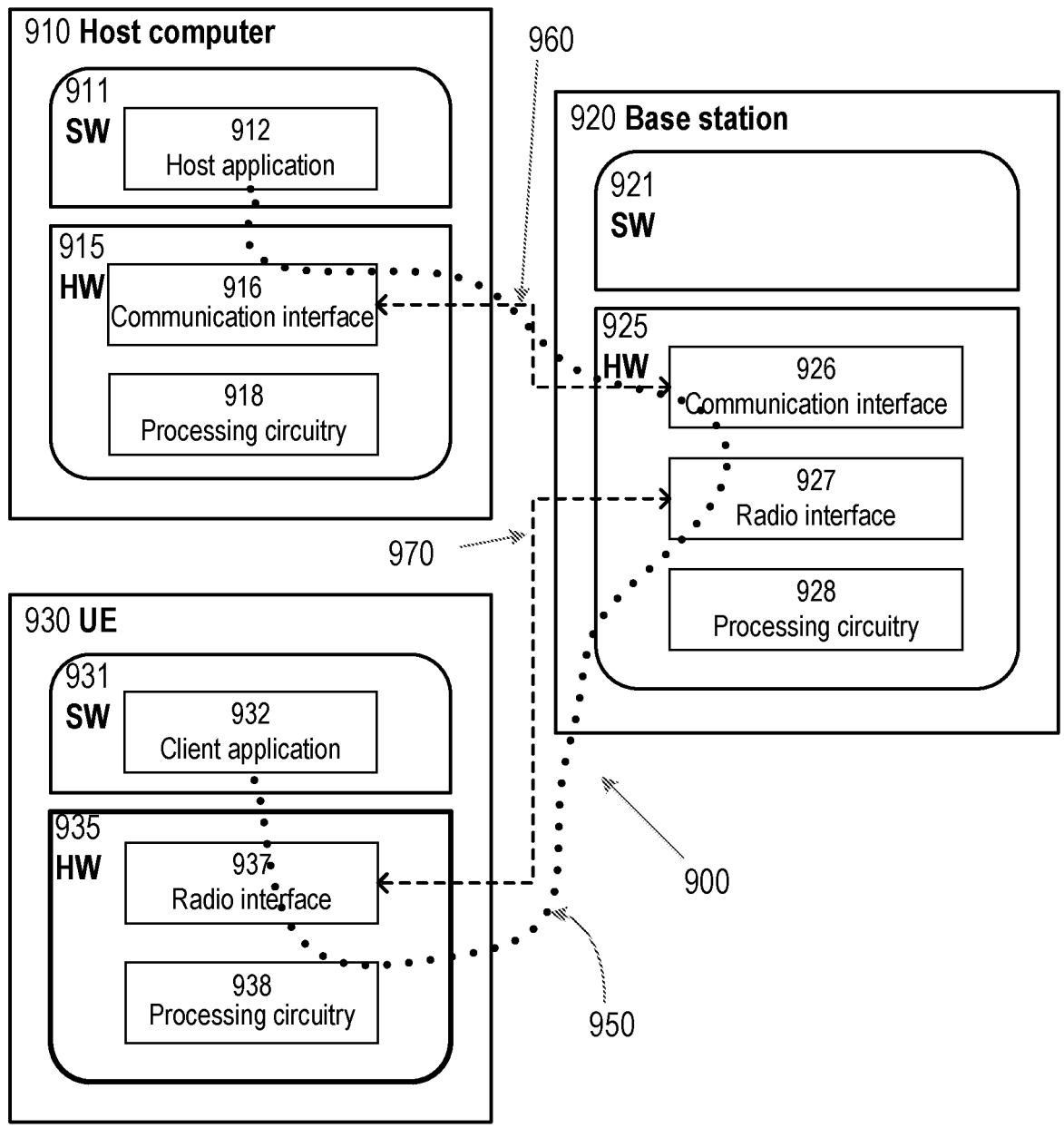
FIG. 9 shows a host computer communicating via a base station with a user equipment over a partially wireless connection in accordance with some embodiments.

FIG. 9 shows a host computer communication via a base station with a user equipment over a partially wireless connection in accordance with some embodiments. Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the data rate by reducing interference caused to nearby UEs and thereby provide benefits such as reduced user waiting time.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
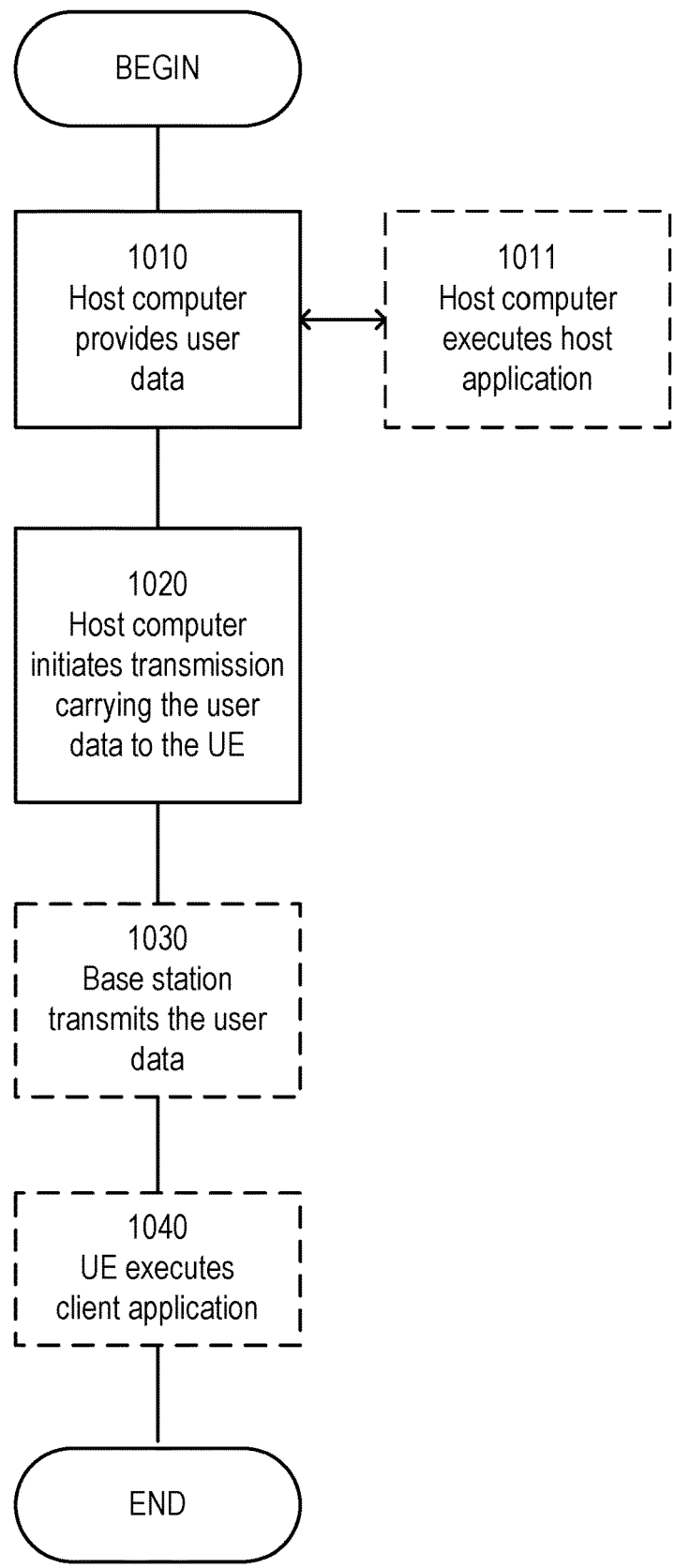
FIGS. 10 to 12 are flowcharts of methods according to embodiments of the disclosure.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
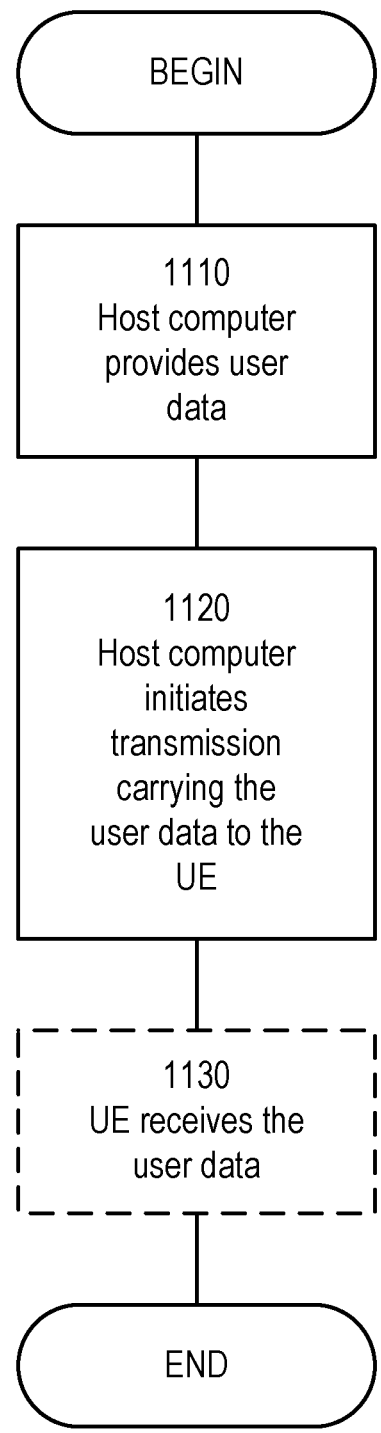

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
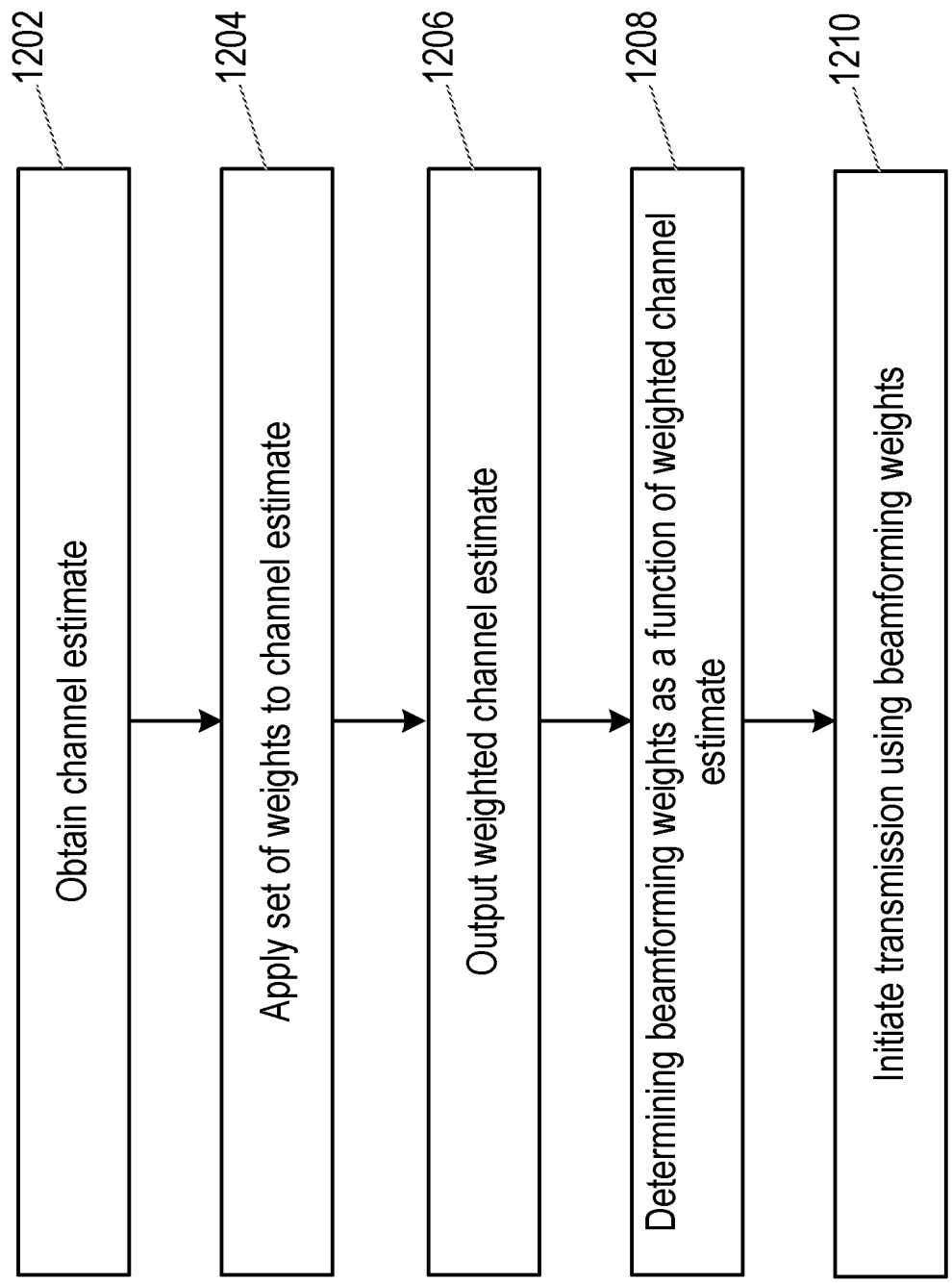

FIG. 12 depicts a method in accordance with particular embodiments. The method enables adjusting beam gain in a radio network node. The method may be performed in the radio network node. The radio network node may be, for example, the network node 100 described above in respect to FIG. 4 or the network node 560 described above in respect of FIG. 5.

The method begins at step 1202 with obtaining a channel estimate based on a reference signal transmitted by a target wireless device. The radio network node may obtain the channel estimate from a processing node (e.g., an uplink baseband processing unit) associated with the radio network node. Alternatively, the radio network node may receive the reference signal transmitted from the target wireless device and calculate a channel estimate based on the received reference signal.

In step 1204, the radio network node applies a set of weights to the channel estimate to obtain a weighted channel estimate. The set of weights may be determined at the radio network node, for example so as to achieve a given, configured or determined reduction in beam gain. The given reduction in beam gain may be determined at the radio network node or it may be predetermined.

The set of weights may be determined by iteratively adjusting the set of weights until the given reduction in beam gain is achieved.

In particular embodiments, the set of weights may be determined by solving $$G(1) - \Delta G - G(\rho) = 0$$

where G(1) denotes a maximum beam gain without weighting of the channel estimate, G(ρ) denotes a maximum beam gain with weighting as a function of a parameter ρ, and ΔG is the given reduction in beam gain. The equation may be solved by starting from an initial set of values, calculated so as achieve the given reduction in beam gain assuming one or more channel conditions (e.g., a flat, or frequency-independent channel). The initial set of values may be selected from a table of predetermined values associated with given reductions in beam gain.

The set of weights may depend on a single configured parameter. For example, the set of weights may comprise values selected from $\rho^x$ where ρ is the configured parameter and x is an integer. In one particular example, the set of weights is equal to:

$$\rho = \begin{pmatrix} \rho^0 & \cdots & \rho^{N-1} \\ \vdots & \ddots & \vdots \\ \rho^0 & \cdots & \rho^{N-1} \end{pmatrix}$$

where N is the number of antenna elements.

The weighted channel estimate may be a Hadamard matrix product (or elementwise matrix product) of the set of weights and the channel estimate.

In step 1206, the weighted channel estimate is output for use in determining beamforming weights to be applied to signals output to a plurality of antenna elements for transmission to the target wireless device.

In step 1208, beamforming weights are determined as a function of the weighted channel estimate.

In step 1210, a transmission is initiated from the radio network node to the target wireless device, in which the determined beamforming weights are applied to a signal vector (e.g., comprising one or more of: user data, control data, and reference signals).

Figure 13:
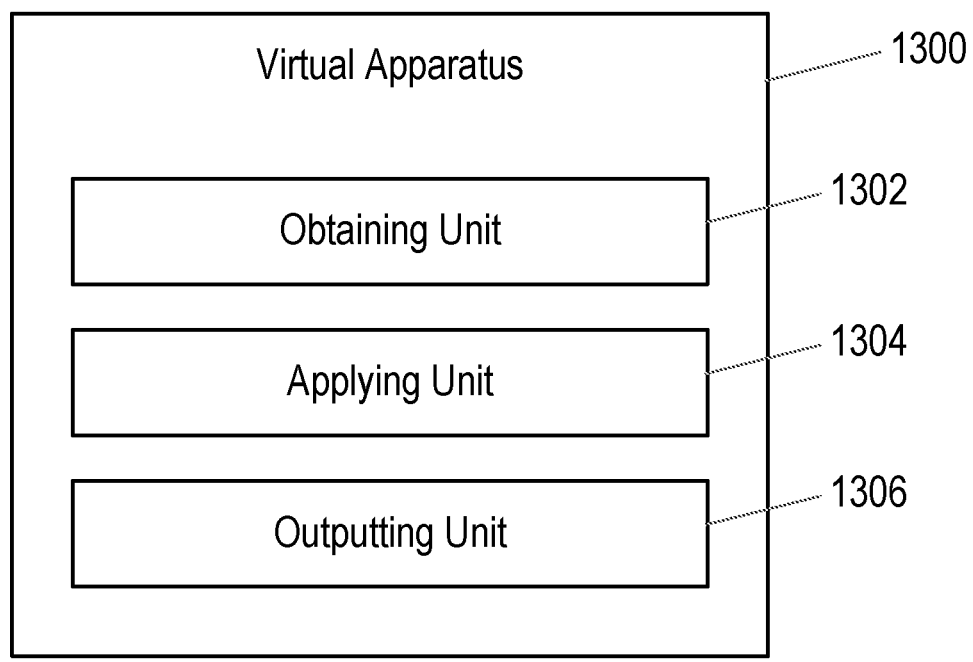
FIG. 13 shows an apparatus according to embodiments of the disclosure.

FIG. 13 illustrates a schematic block diagram of an apparatus 1300 in a wireless network (for example, the wireless network shown in FIG. 5). The apparatus may be implemented in a wireless device or network node (e.g., wireless device 510 or network node 560 shown in FIG. 5). Apparatus 1300 is operable to carry out the example method described with reference to FIG. 12 and possibly any other processes or methods disclosed herein. It is also to be understood that the method of FIG. 12 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1302, applying unit 1304 and outputting unit 1306, and any other suitable units of apparatus 1300 to perform corresponding functions according one or more embodiments of the present disclosure.

As illustrated in FIG. 13, apparatus 1300 includes obtaining unit 1302, applying unit 1304 and outputting unit 1306. Obtaining unit 1302 is configured to obtain a channel estimate based on a reference signal transmitted by a target wireless device. Applying unit 1304 is configured to apply a set of weights to the channel estimate to obtain a weighted channel estimate. Outputting unit 1306 is configured to output the weighted channel estimate for use in determining beamforming weights to be applied to signals output to the plurality of antenna elements for transmission to the target wireless device, wherein the beamforming weights are determined as a function of the weighted channel estimate.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered paragraphs set out embodiments of the disclosure.

EMBODIMENTS

Group B Embodiments

1. A method for adjusting beam gain in a radio network node, the method comprising:
    obtaining a channel estimate based on a reference signal transmitted by a target wireless device;
    applying a set of weights to the channel estimate to obtain a weighted channel estimate; and
    outputting the weighted channel estimate for use in determining beamforming weights to be applied to signals output to a plurality of antenna elements for transmission to the target wireless device, wherein the beamforming weights are determined as a function of the weighted channel estimate.
2. The method according to embodiment 1, further comprising determining the set of weights to be applied to the channel estimate.
3. The method according to embodiment 2, wherein the set of weights is determined so as to achieve a given reduction in beam gain.
4. The method according to embodiment 3, wherein determining the set of weights comprises iteratively adjusting the set of weights until the given reduction in beam gain is achieved.
5. The method according to embodiment 4, wherein the set of weights are initialized to a set of initial values to achieve the given reduction in beam gain assuming a flat channel.
6. The method according to embodiment 5, wherein the set of initial values is obtained from a table of predetermined values associated with given reductions in beam gain assuming a flat channel
7. The method according to any one of embodiments 3 to 6, wherein determining the set of weights comprises solving $$G(1)-\Delta G-G(\rho)=0$$

where G(1) denotes a maximum beam gain without weighting of the channel estimate, G($\rho$) denotes a maximum beam gain with weighting as a function of a parameter $\rho$, and $\Delta G$ is the given reduction in beam gain.
8. The method according to any one of the preceding embodiments, wherein the set of weights depend on a single configured parameter.
9. The method according to embodiment 8, wherein the set of weights comprise values selected from $\rho^x$ where $\rho$ is the configured parameter and x is an integer.
10. The method according to embodiment 9, wherein the set of weights is equal to $$\rho = \begin{pmatrix} \rho^0 & \cdots & \rho^{N-1} \\ \vdots & \ddots & \vdots \\ \rho^0 & \cdots & \rho^{N-1} \end{pmatrix}$$

where N is the number of antenna elements.
11. The method according to any one of the preceding embodiments, wherein the weighted channel estimate is a Hadamard matrix product of the set of weights and the channel estimate.
12. The method according to any one of the preceding embodiments, wherein obtaining a channel estimate comprises:
    receiving a reference signal transmitted by the target wireless device; and
    calculating a channel estimate based on the received reference signal.
13. The method according to any one of embodiments 1 to 11, wherein obtaining a channel estimate comprises:
    receiving a channel estimate from a processing node associated with the radio network node.
14. The method according to any one of the preceding embodiments, further comprising:
    determining, as a function of the weighted channel estimate, beamforming weights to be applied to signals output to the plurality of antenna elements for transmission to the target wireless device.
15. The method according to embodiment 14, wherein determining beamforming weights comprises utilizing a minimum mean square error algorithm.

16. The method according to embodiment 14 or 15, wherein determining beamforming weights comprises determining beamforming weights W according to $$W = \hat{\mathsf{H}}_w \, (\hat{\mathsf{H}}_w \, \hat{\mathsf{H}}_w{}^H + \Gamma)^{-1}$$

where $\hat{\mathsf{H}}_w$ is the weighted channel estimate, $\Gamma$ is the covariance matrix of a channel estimation error, and $\hat{\mathsf{H}}_w{}^H$ is the complex transpose of $\hat{\mathsf{H}}_w$.

17. The method according to any one of the preceding embodiments, wherein the channel estimate comprises one or more zeros located on or close to a unit circle of the channel estimate, and wherein the set of weights are configured such that the one or more zeros are moved from the unit circle and the weighted channel estimate comprises no zeroes on the unit circle.

18. The method according to any one of the preceding embodiments, wherein the method is performed in the radio network node.

19. The method of any of the previous embodiments, further comprising:
   obtaining user data; and
   forwarding the user data to a host computer or a wireless device.

Group C Embodiments

20. A network node comprising:
   processing circuitry configured to perform any of the steps of any of the Group B embodiments;
   power supply circuitry configured to supply power to the base station.

21. A base station comprising:
   processing circuitry configured to perform any of the steps of any of the Group B embodiments;
   power supply circuitry configured to supply power to the base station.

22. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

23. The communication system of the previous embodiment further including the base station.

24. The communication system of the previous 2 embodiments, further including the UE, wherein the UE is configured to communicate with the base station.

25. The communication system of the previous 3 embodiments, wherein:
   the processing circuitry of the host computer is configured to execute a host application, thereby providing the user data; and
   the UE comprises processing circuitry configured to execute a client application associated with the host application.

26. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.

27. The method of the previous embodiment, further comprising, at the base station, transmitting the user data.

28. The method of the previous 2 embodiments, wherein the user data is provided at the host computer by executing a host application, the method further comprising, at the UE, executing a client application associated with the host application.

29. A user equipment (UE) configured to communicate with a base station, the UE comprising a radio interface and processing circuitry configured to performs the of the previous 3 embodiments.

30. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

31. The communication system of the previous embodiment further including the base station.

32. The communication system of the previous 2 embodiments, further including the UE, wherein the UE is configured to communicate with the base station.

33. The communication system of the previous 3 embodiments, wherein:
   the processing circuitry of the host computer is configured to execute a host application;
   the UE is configured to execute a client application associated with the host application, thereby providing the user data to be received by the host computer.

The invention claimed is:

1. A method for adjusting beam gain in a radio network node, the method comprising:
   obtaining a channel estimate based on a reference signal transmitted by a target wireless device;
   determining a set of weights to be applied to the channel estimate, wherein the set of weights is determined so as to achieve a given reduction in beam gain, wherein determining the set of weights comprises iteratively adjusting the set of weights until the given reduction in beam gain is achieved, and wherein determining the set of weights comprises solving $G(1) - \Delta G - G(\rho) = 0$, where
   $G(1)$ denotes a maximum beam gain without weighting of the channel estimate,
   $G(\rho)$ denotes a maximum beam gain with weighting as a function of a parameter $\rho$, and $\Delta G$ is the given reduction in beam gain;
   applying the determined set of weights to the channel estimate to obtain a weighted channel estimate; and
   determining, as a function of the weighted channel estimate, beamforming weights to be applied to signals output to a plurality of antenna elements for transmission to the target wireless device.

2. The method according to claim 1, wherein the set of weights are initialized to a set of initial values to achieve the given reduction in beam gain assuming a flat channel.

3. The method according to claim 2, wherein the set of initial values is obtained from a table of predetermined values associated with given reductions in beam gain assuming the flat channel.

4. The method according to claim 1, wherein the set of weights depends on a single configured parameter.

5. The method according to claim 4, wherein the set of weights comprise values selected from $\rho^x$ where $\rho$ is the single configured parameter and x is an integer.

6. The method according to claim 5, wherein the set of weights is equal to $$\rho = \begin{pmatrix} \rho^0 & \cdots & \rho^{N-1} \\ \vdots & \ddots & \vdots \\ \rho^0 & \cdots & \rho^{N-1} \end{pmatrix}$$

where N is a number of antenna elements.

7. The method according to claim 1, wherein the weighted channel estimate is a Hadamard matrix product of the set of weights and the channel estimate.

8. The method according to claim 1, wherein obtaining the channel estimate comprises:
receiving the reference signal transmitted by the target wireless device; and
calculating the channel estimate based on the received reference signal.

9. The method according to claim 1, wherein obtaining the channel estimate comprises:
receiving the channel estimate from a processing node associated with the radio network node.

10. The method according to claim 1, wherein determining the beamforming weights comprises utilizing a minimum mean square error algorithm.

11. The method according to claim 1, wherein determining the beamforming weights comprises determining beamforming weights W according to $$W = \hat{H}_w (\hat{H}_w \hat{H}_w^H + \Gamma)^{-1}$$

where $\hat{H}_w$ is the weighted channel estimate, $\Gamma$ is a covariance matrix of a channel estimation error, and $\hat{H}_w^H$ is a complex transpose of $\hat{H}_w$.

12. The method according to claim 1, wherein the channel estimate comprises one or more zeros located on or close to a unit circle of the channel estimate, and wherein the set of weights are configured such that the one or more zeros are moved from the unit circle and the weighted channel estimate comprises no zeroes on the unit circle.

13. The method according to claim 1, wherein the method is performed in the radio network node.

14. A network node comprising:
processing circuitry; and
a memory comprising instructions which, when executed by the processing circuitry, cause the network node to:
obtain a channel estimate based on a reference signal transmitted by a target wireless device;
determine a set of weights to be applied to the channel estimate, wherein the set of weights is determined so as to achieve a given reduction in beam gain, wherein to determine the set of weights comprises iteratively adjusting the set of weights until the given reduction in beam gain is achieved, and wherein to determine the set of weights comprises solving $G(1)-\Delta G-G(\rho)=0$, where $G(1)$ denotes a maximum beam gain without weighting of the channel estimate, $G(\rho)$ denotes a maximum beam gain with weighting as a function of a parameter $\rho$, and $\Delta G$ is the given reduction in beam gain;
apply the determined set of weights to the channel estimate to obtain a weighted channel estimate; and
determine, as a function of the weighted channel estimate, beamforming weights to be applied to signals output to a plurality of antenna elements for transmission to the target wireless device.

15. The network node according to claim 14, wherein the set of weights depends on a single configured parameter.

16. The network node according to claim 15, wherein the set of weights comprise values selected from $\rho^x$ where $\rho$ is the single configured parameter and x is an integer.

17. The network node according to claim 16, wherein the set of weights is equal to $$\rho = \begin{pmatrix} \rho^0 & \cdots & \rho^{N-1} \\ \vdots & \ddots & \vdots \\ \rho^0 & \cdots & \rho^{N-1} \end{pmatrix}$$

where N is a number of antenna elements.

* * * * *